*INVENTOR.*
ROBERT H. PARK

INVENTOR.
ROBERT H. PARK

Inventor:
Robert H. Park.

INVENTOR
ROBERT H. PARK

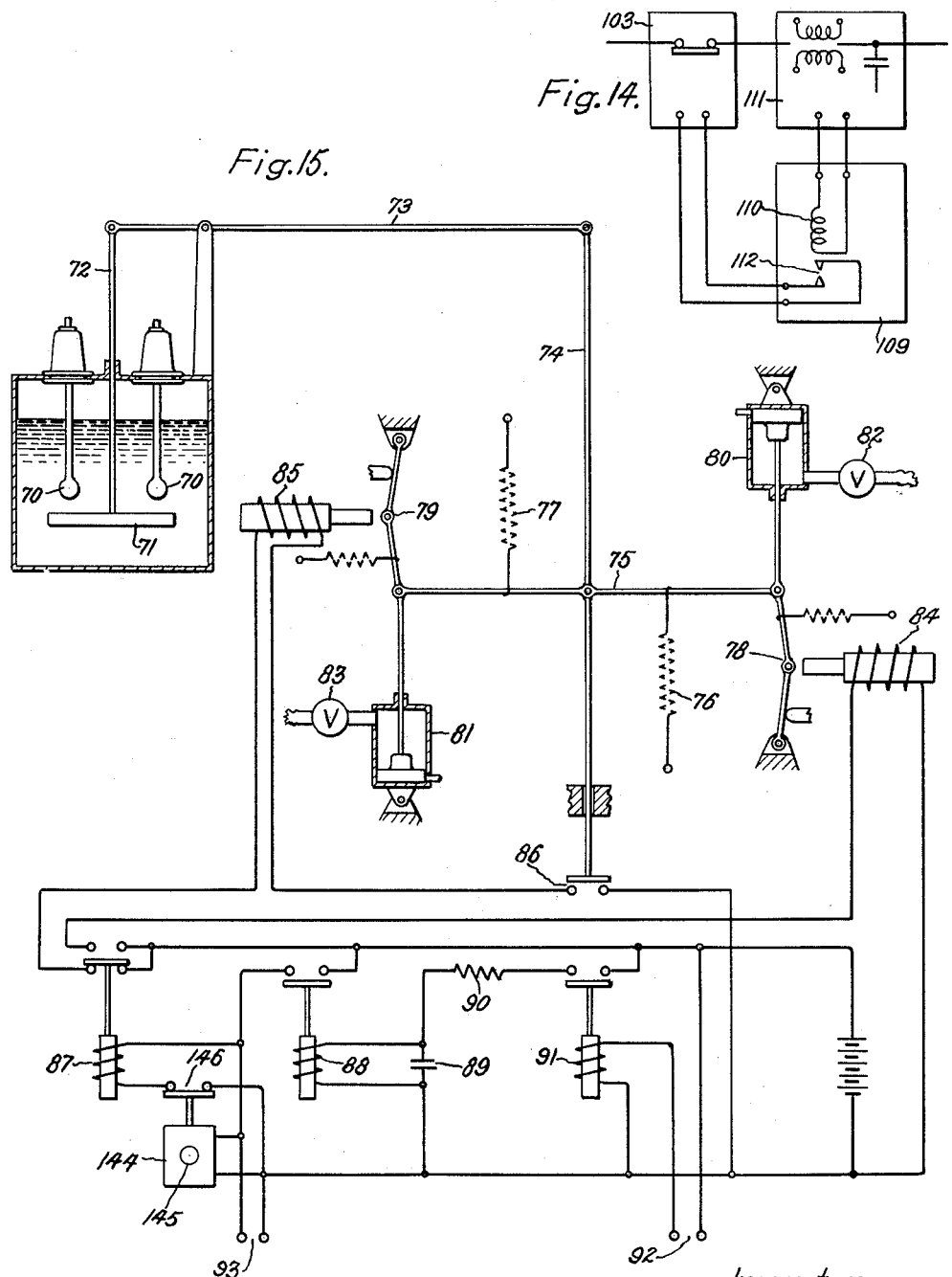

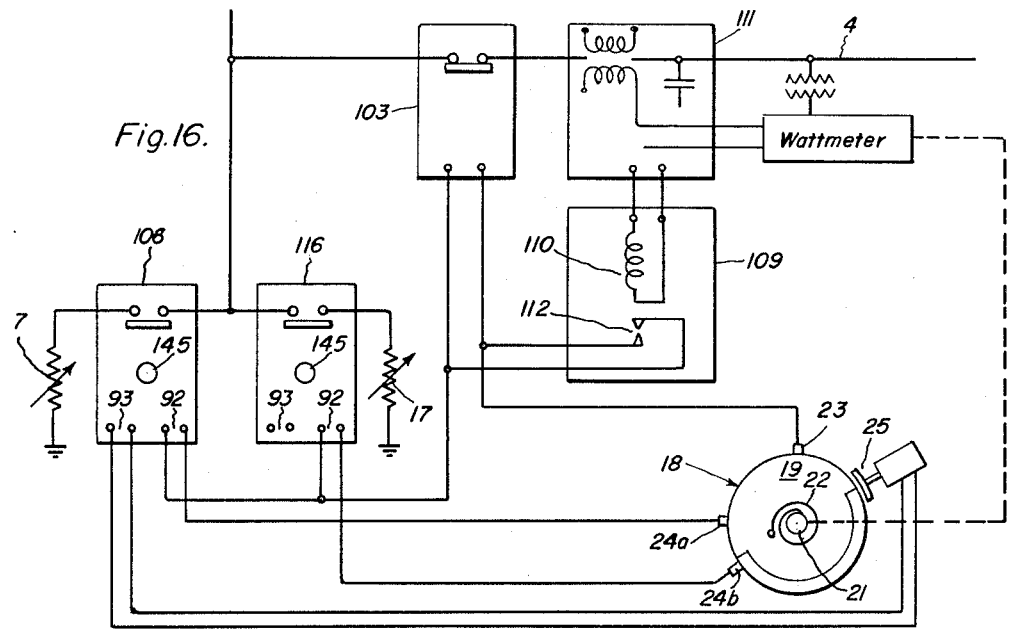
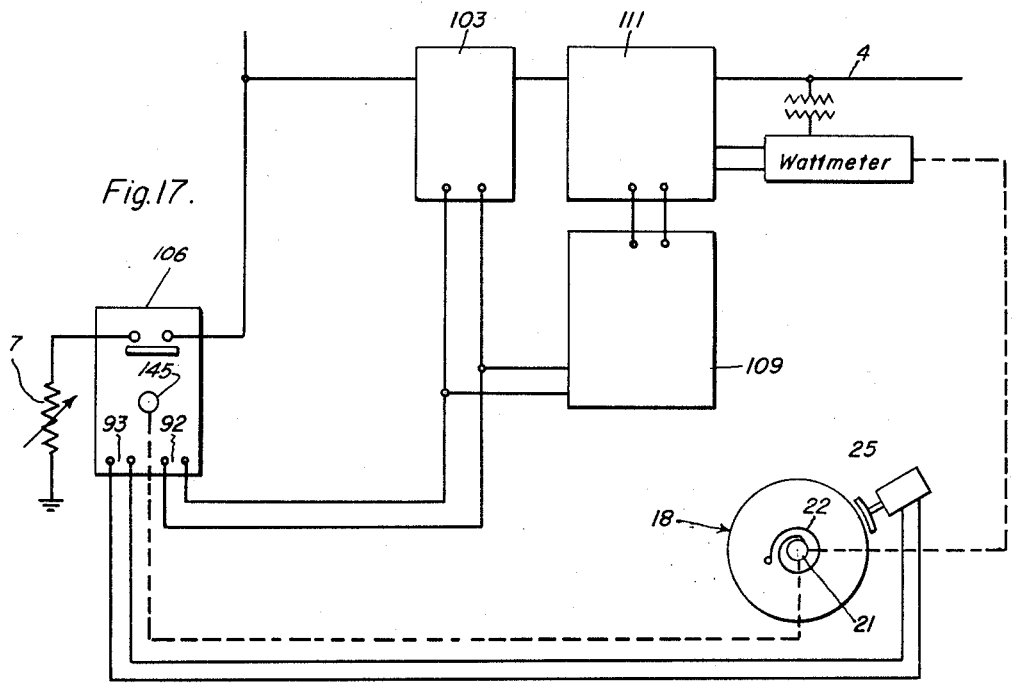

Inventor:
Robert H. Park, 3,051,842
MEANS FOR MAINTAINING STABILITY OF POWER TRANSMISSION SYSTEMS DURING A FAULT
Robert H. Park, Corporation Road, Dennis, Mass.
Filed Oct. 19, 1960, Ser. No. 63,693
25 Claims. (Cl. 307—52)

This invention relates to power transmission systems and has for its object the provision of reliable and efficient means for maintaining the electrical stability of such systems subsequent to the occurrence of faults on the lines resulting from insulator flashovers due to lightning, or other causes of a temporary nature.

This application is a continuation in part of my co-pending application Serial No. 848,489, filed October 13, 1959, which is a continuation in part of my abandoned application Serial No. 769,055, filed October 21, 1958, which application is a continuation in part of my abandoned application Serial No. 582,589, filed May 3, 1956.

In power transmission systems a short circuit fault on a line normally operates circuit breakers at each end of the line thereby to isolate the fault, while further after a preset period, chosen long enough normally to extinguish an arc, the breakers may be reclosed automatically.

During the period prior to the opening of the breakers there is a relative acceleration between those synchronous machines within the system which are adjacent to the end of the line that was supplying power prior to the fault and those adjacent to the other end of the line, the relative acceleration being such as to increase the relative angular displacement.

This tendency, moreover, ordinarily continues after the circuit breakers have opened, especially if the line in question represents the sole tie between a generating plant and a receiving system or between two otherwise isolated systems or segments of systems.

The effect of such acceleration at one end and of deceleration at the other end is to produce a difference in the velocities and an increase in the relative phase angle between the group of machines adjacent one end of the line, and the group of machines adjacent the other end of the line, with a resultant tendency to loss of synchronism and instability causing voltage disturbances which operate to affect adversely the performance of connected equipment throughout the system.

Accordingly, it is an object of my invention to reduce to a minimum such differences in velocities and increases in phase angle.

According to known techniques, design of power transmission systems has been based mainly on the practices of utilizing two or more parallel lines, interconnecting generators in generating stations, either through low or high voltage busses, connecting parallel lines together at both ends, and also, in the case of long lines, through one or more sectionalizing busses located at intermediate points between the ends and providing high speed switches and relaying adapted to rapidly open the switches at either end of a line or section of line that has become faulted thereby to isolate the fault, while also it is often the practice to reclose the same breakers after a short interval during which the arc at the point of fault may be expected to have become extinguished.

Published theoretical studies have been carried out relative to the advantages which can be realized through use of relaying and circuit breakers adapted to rapidly open the breakers at both ends of a single transmission line connecting generators in a generating station to a load center thereby decoupling the generating station from the load center, and then, after a brief interval, reclosing these breakers.

These studies have shown that, in this single line case, use of the principle of rapid reclosing will often result in instability, when the load on the generators exceeds a critical value less than full load, even when the highest practicable speed of reclosing is utilized.

One phase of my invention relates to the procedure in conjunction with such single line transmission and automatic reclosing, of, in the event of a line fault, promptly isolating the fault and applying a resistive braking load to the generator or generators feeding the line, and disconnecting this load, preferably at or about the time that the line breakers reclose, and constitutes an improvement over procedures heretofore described.

In another phase of this form of my invention, means are employed whereby the driving force of the generator prime mover or prime movers is rapidly reduced on the occurrence of a line fault and thereafter rapidly restored at or about the time the line breakers reclose.

Another object of my invention is to make practicable the use of single line in place of double line transmission systems, with a resultant saving in capital cost.

Another object of my invention is to allow use of longer and lower voltage single line transmission systems than would otherwise be practicable.

Another object of my invention is to allow full generating station power transmission over on of two parallel lines without danger of instability in the event of a line fault when the other line is out of service due to need for repairs or for other reason.

Another object of my invention is to allow the stable transmission of power generated by two or more generators or groups of generators, over parallel lines, without electrical connection between the generators or groups of generators at the one end of the lines, with concomitant reduction in generator and circuit breaker duty, and in shock to the receiver system in the event of line fault.

Another object of my invention is to insure maintenance of stability of a two parallel line transmission system in the event that faults occur simultaneously on both lines.

A further object of my invention is to provide a means of increasing the transient stability of power systems in which generating plants, or more broadly in which segments of a system contain generating capacity beyond the need of the segment, are tied to the balance of the system by means of either one or a plurality of lines.

In the latter case the invention may provide that not only do breakers operate at each end of the faulted line to isolate the fault, but also that other breakers are simultaneously actuated whereby a generating plant, or, more broadly, a preselected segment of the complete system supplying power to the balance of the system before the fault, is detached or decoupled and has a braking load of controlled magnitude applied to the segment for a preset period, or a braking load of preset magnitude applied for a controlled period, and/or a momentary reduction effected in the driving power of generator prime movers within the segment, after which all of the breakers that had just been opened are automatically reclosed, and wherein either the magnitude or duration of the braking load and/or power output reduction applied is adjusted to be held generally in a predetermined relation to the net load which the generator, generators, or more generally, system generating segment was supplying to the balance of the system just prior to the fault.

In another aspect of my invention this procedure may be modified so that only the breakers at either end of the faulted line are opened, while provision is made to effect a momentary reduction of generating segment prime mover driving force, of controlled magnitude and/or duration, adjusted in respect to the net load which the generating segment was supplying to the balance of the system just prior to the fault, while in still another aspect of my invention the foregoing is supplemented by provision that the fault is caused to effect a modification of generator prime mover driving power characteristics whereby it results that following clearance of the fault and return to steady power flow conditions the amount of power transmitted over the transmission system from the generating segment to the receiving segment is reduced relative to conditions obtaining just prior to the fault.

In a modified form of the last mentioned two aspects of my invention, involving a plurality of lines, and in which only breakers at either end of a faulted line are opened, and which is adapted to use when the generating segment incorporates more than one generator, provision is made to reduce effective generating segment power during the period that the line is open, by disconnecting or decoupling one or more generators from the generating segment and applying a braking load and/or a reduction of prime mover motive force to said generators during this period, and subsequently reconnecting the said generators to the generating segment at the end of the said period.

In this last form of my invention provisions can be made, at the same time, in case of a two parallel line transmission system, so that a braking load will be applied to all of the generators of the generating segment in the event of a simultaneous fault on each of the two lines.

Other objects and advantages of the invention will become apparent from the following detailed description taken in conjunction with the accompanying drawings, wherein.

Figure 5:
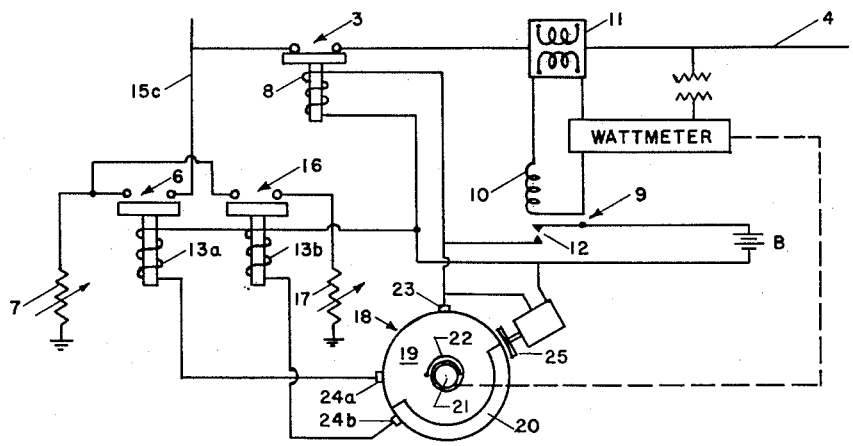
FIG. 5 shows a circuit generator for varying the resistive load to be applied at the time of fault.
Figure 6:
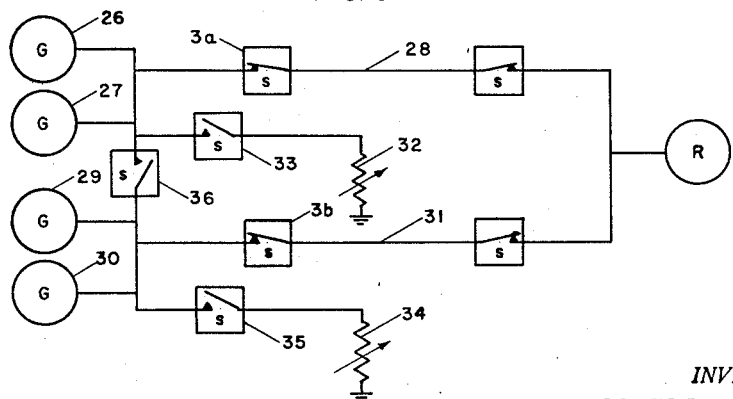
Figure 7:
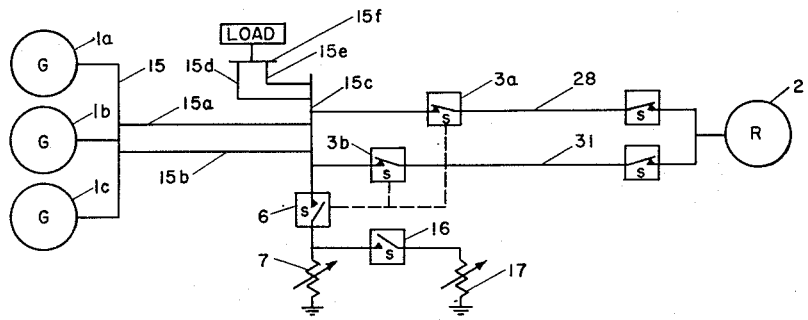
Figure 8:
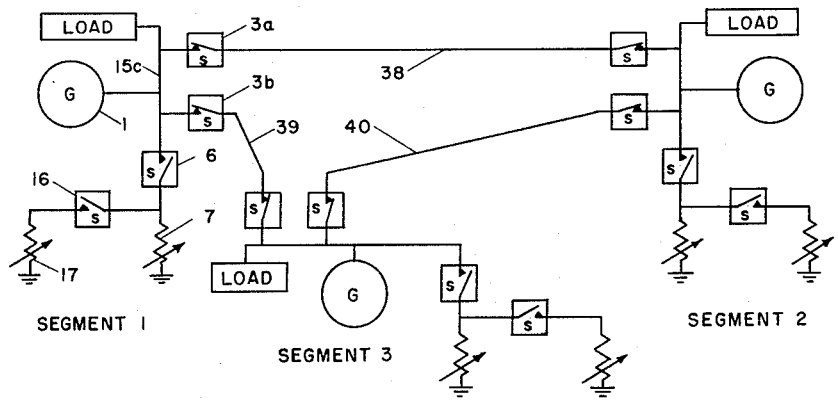
Figure 11:
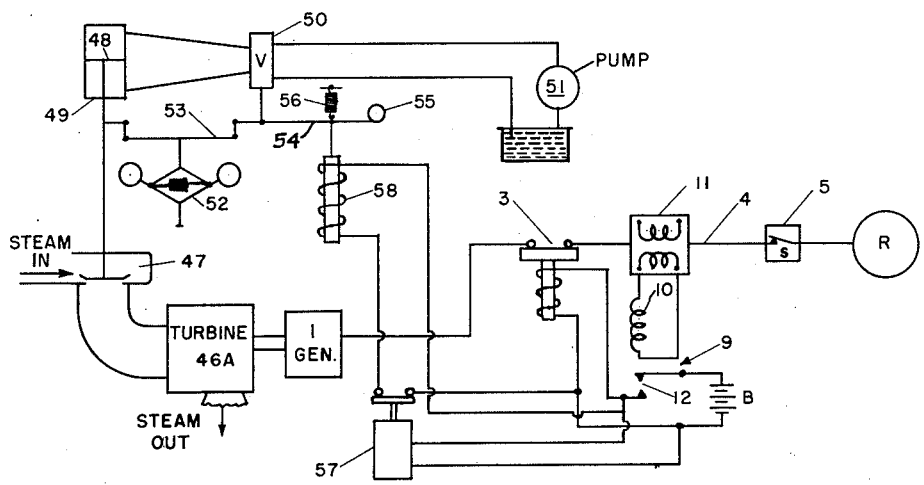
Figure 9:
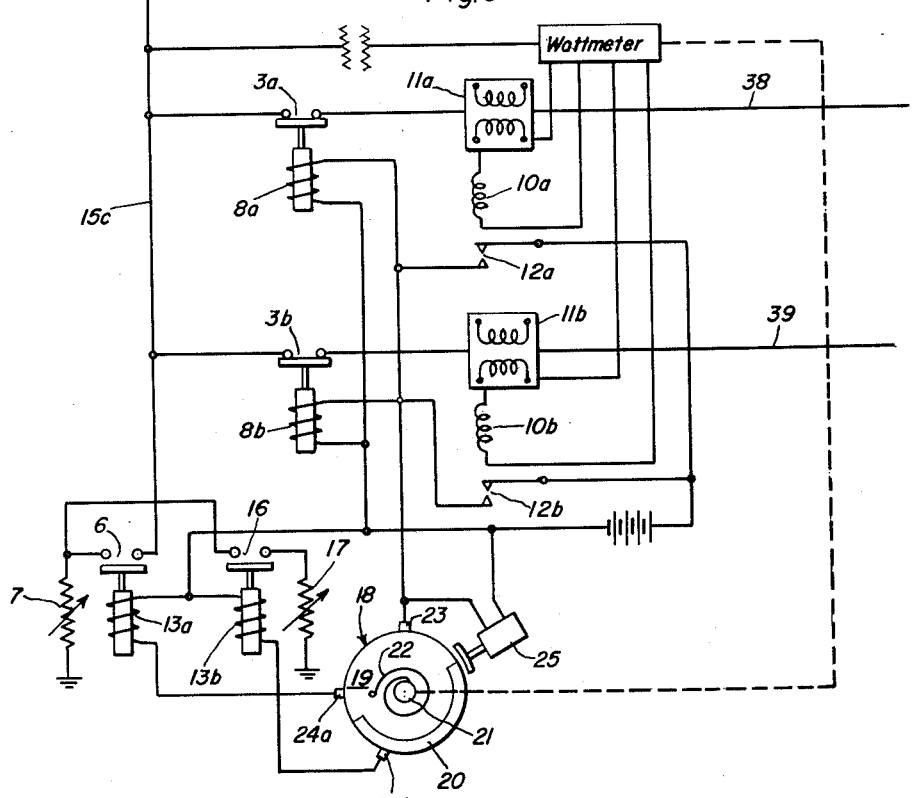
Figure 10:
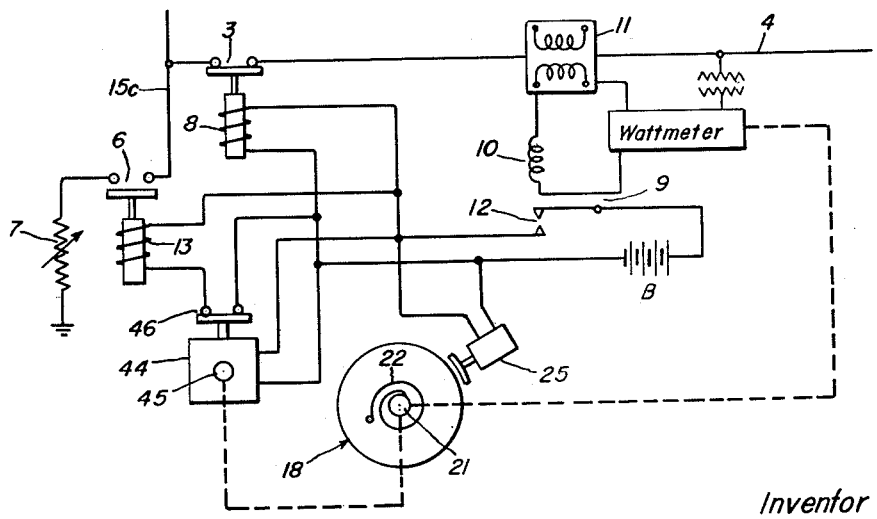
Figure 12:
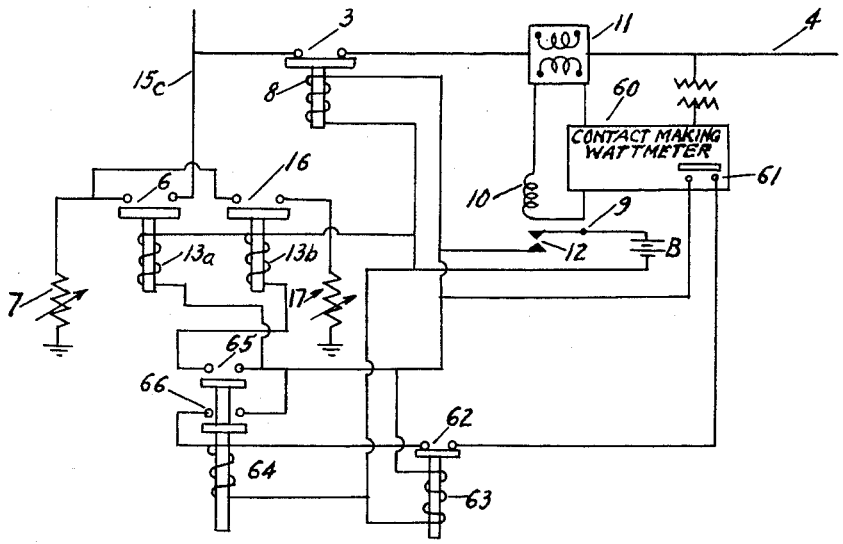
Figure 13:
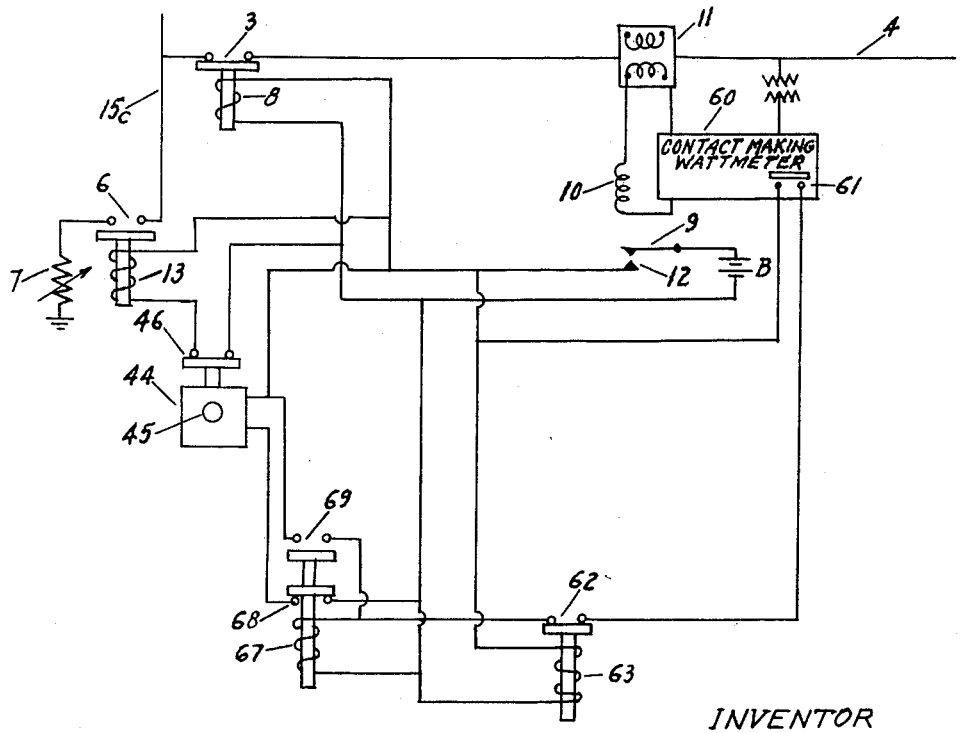

FIG. 6 relates to the invention as applied to a multi-generator power station feeding a pair of parallel lines;

FIG. 7 relates to an embodiment of the invention in which a segment of a power system containing load as well as generating capacity, supplies power to the balance of the system over two parallel lines;

FIG. 8 relates to the invention as applied to a power system in which the flow of power between major segments of a power system takes place over a plurality of non-parallel lines;

FIG. 9 illustrates one means of applying the invention to the system of FIG. 8;

FIGS. 10 and 11 show alternative embodiments of my invention;

FIGS. 12 and 13 show alternative embodiments of FIGS. 5 and 10 respectively, of my invention;

FIG. 14 is a fragmentary simplified diagram of circuit breaker and relay control systems for incorporation in the systems of FIGS. 1 through 10, 12 and 13.

FIG. 15 is a simplified diagram of a modified form of resistor load circuit breaker and control system therefor.

Figure 18:
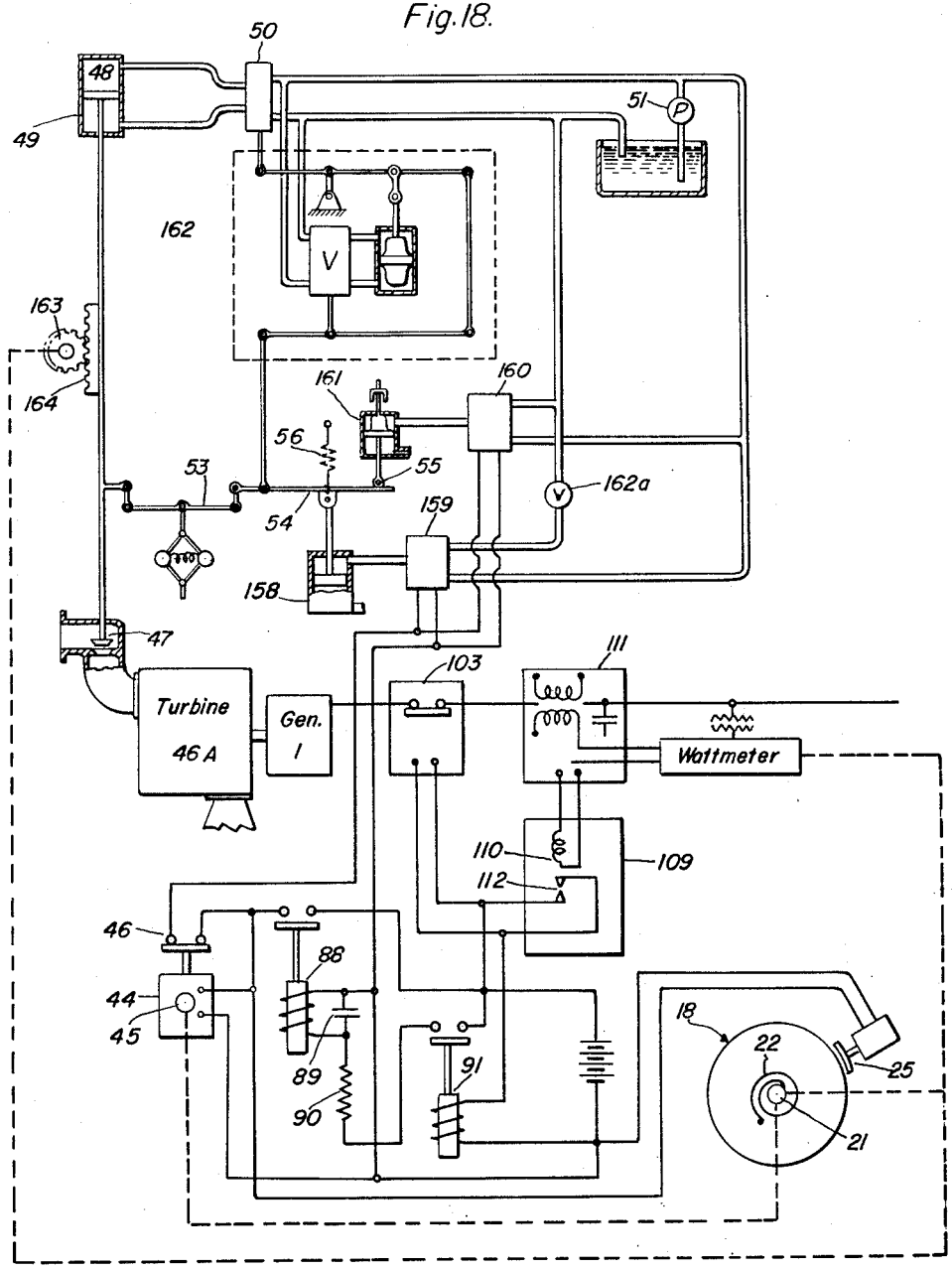

FIGS. 16, 17 and 18 show the breaker and control systems of FIGS. 14 and 15 as applied to the systems of FIGS. 5, 10 and 11 respectively.

Figure 19:
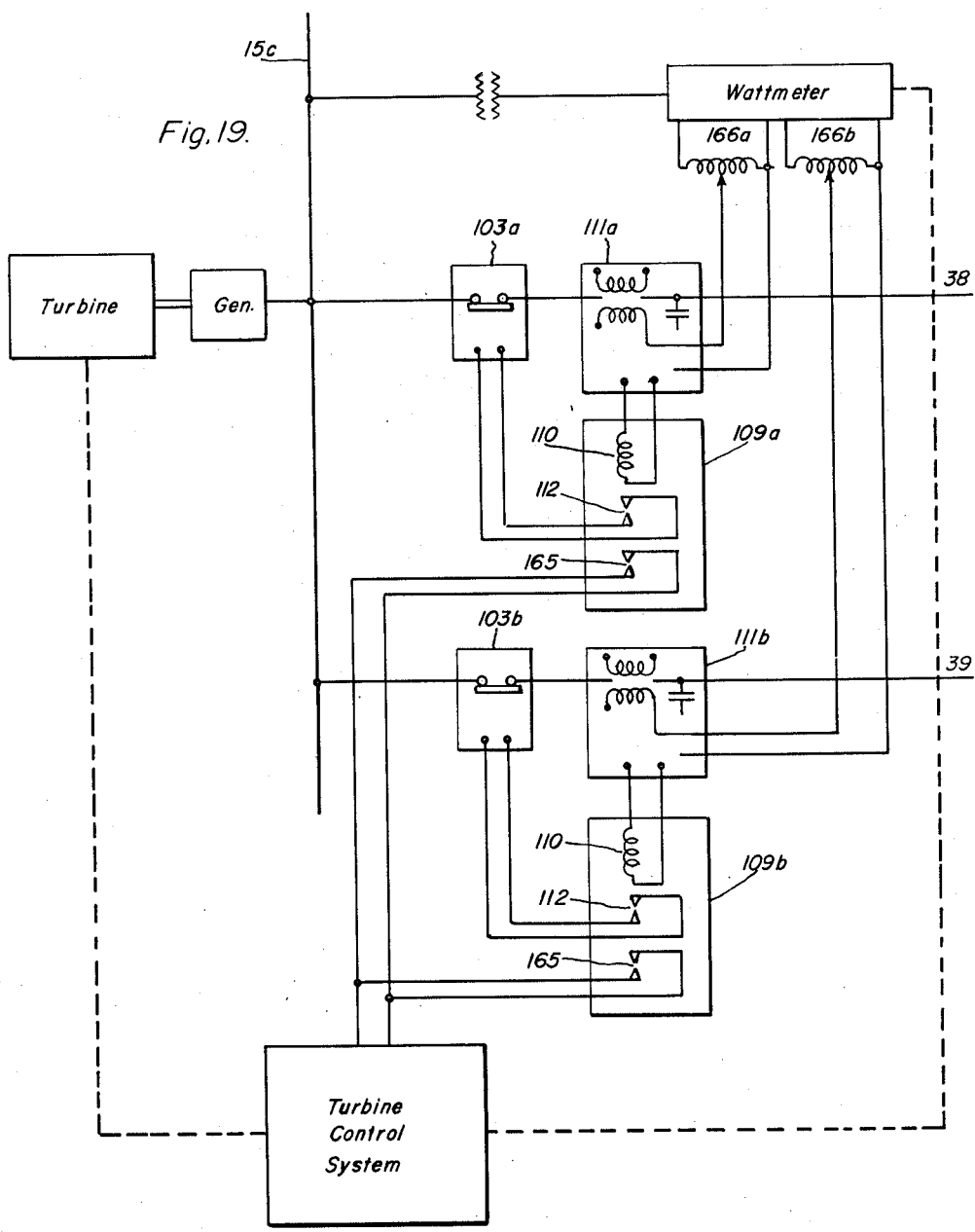

FIG. 19 is a simplified diagram of automatic control means for the prime mover motive power unit of generators of FIG. 8.

Figure 20:
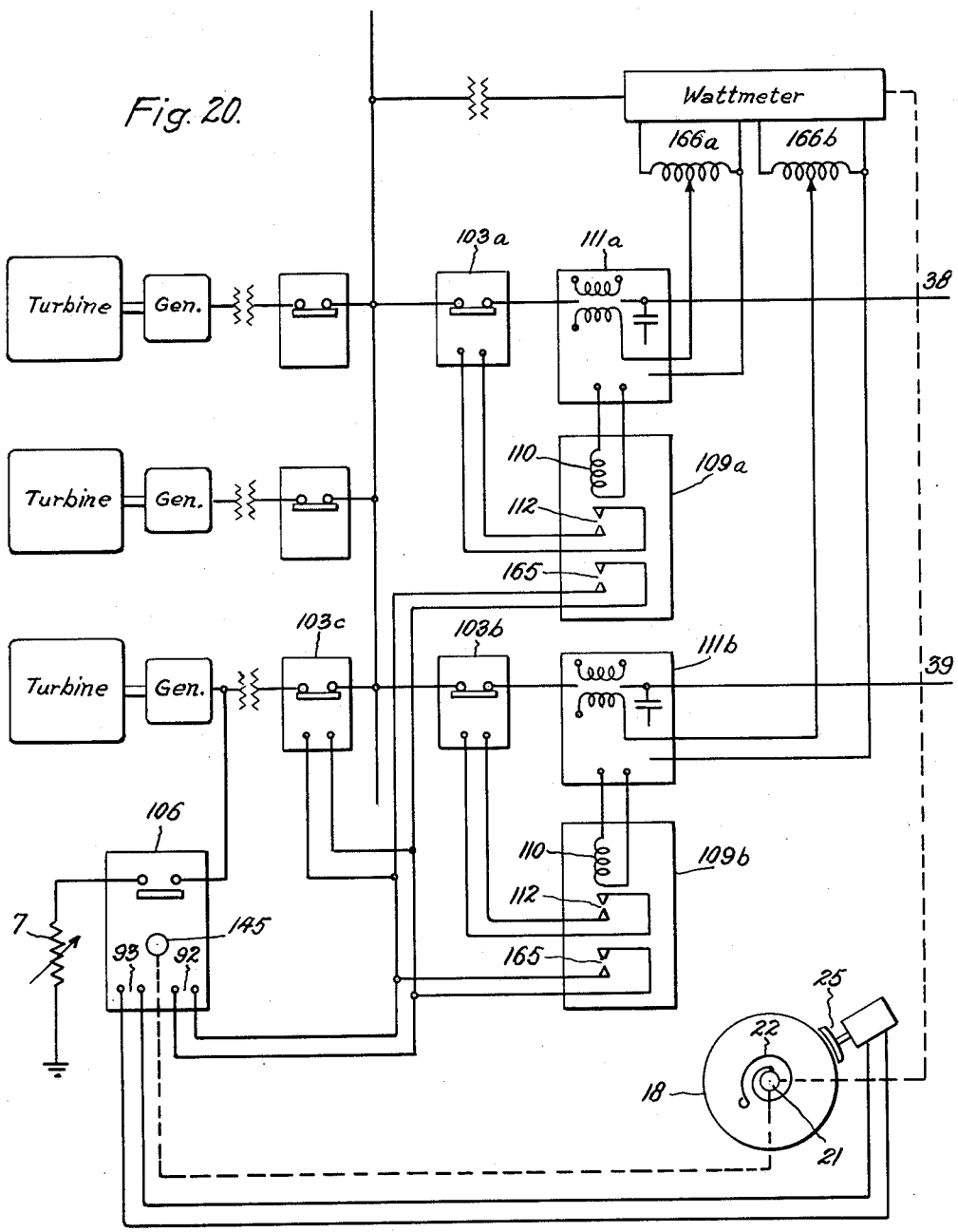

FIG. 20 is a simplified diagram in which provision is shown for momentarily isolating a portion of the normally interconnected generating capacity of a generating segment in the event of a line fault.

Figure 21:
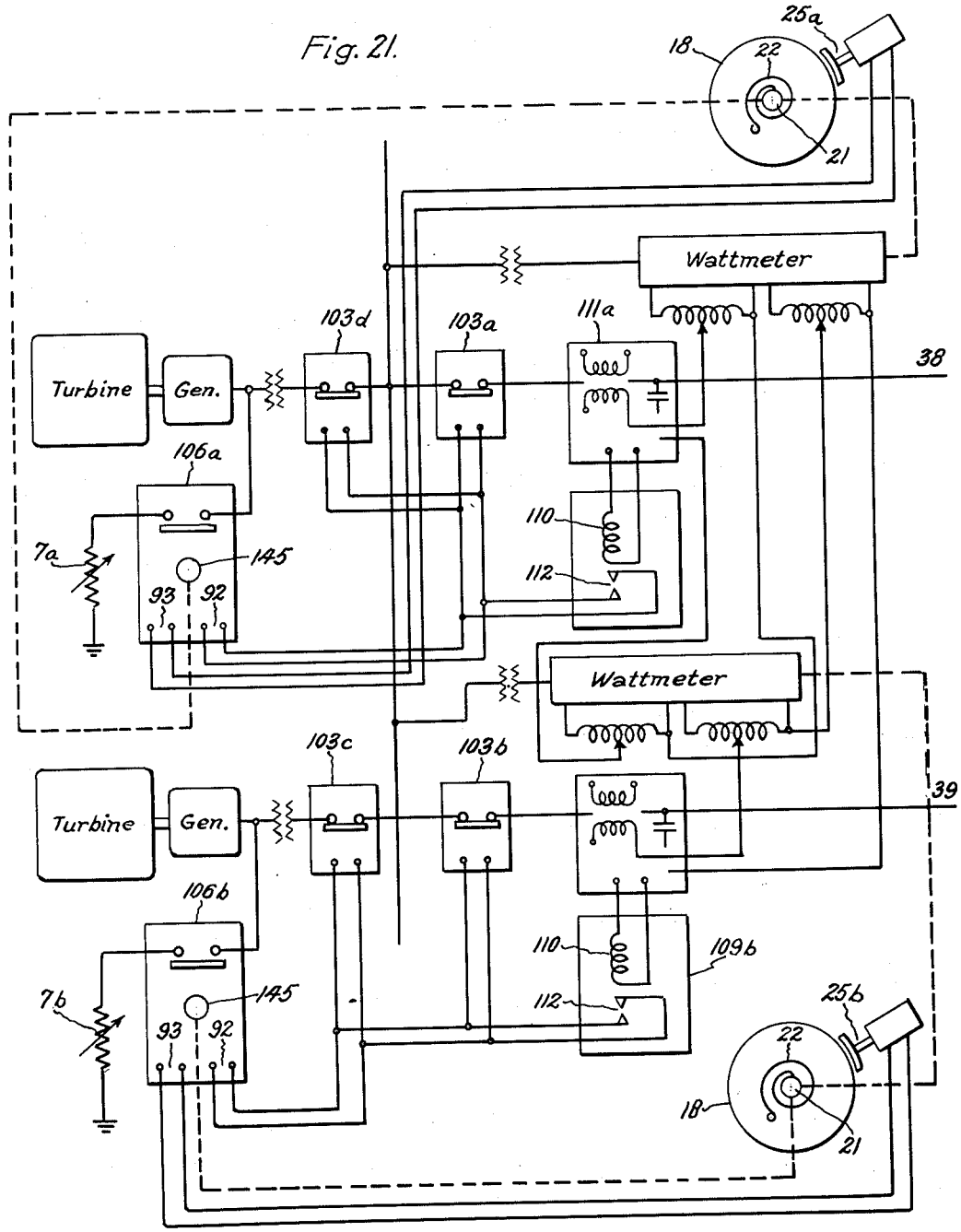

FIG. 21 is a simplified diagram which shows a modification of the arrangement of FIG. 20 which provides so that the whole generating segment will be isolated in the event of a fault on both lines of a two parallel line transmission system.

Figure 1:
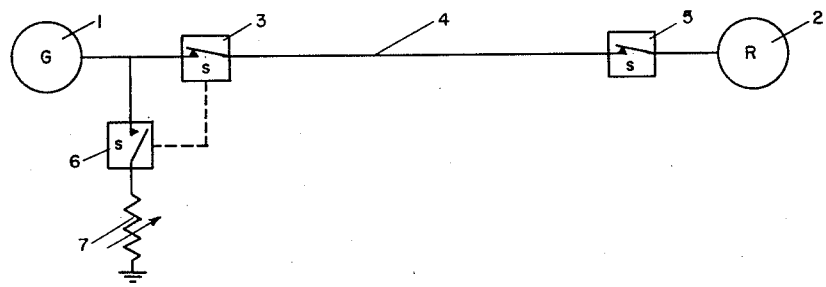
FIG. 1 is a simplified single line diagram of a power transmission system and relates to one embodiment of the invention in which a single generator supplies power to a power system over a single line.

Referring now to FIG. 1, in the prior art relating to employment of braking resistors as system stabilizing means, a generator 1 is coupled to a receiving system 2 via a first reclosing type circuit breaker 3, transmission line 4, and a second reclosing type circuit breaker 5. A branch circuit comprising a resistor 7 and a normally open circuit breaker 6 is coupled to the generator terminals of generator 1. During normal operation, power is transmitted over line 4; however, upon the occurrence of a fault on the line 4, circuit breakers 3 and 5 open thereby isolating the fault and decoupling the generator 1 from the receiving system 2 while circuit breaker 6 closes. The common control of circuit breakers 3 and 6 is shown by a dotted line joining the two circuit breakers.

Figure 2:
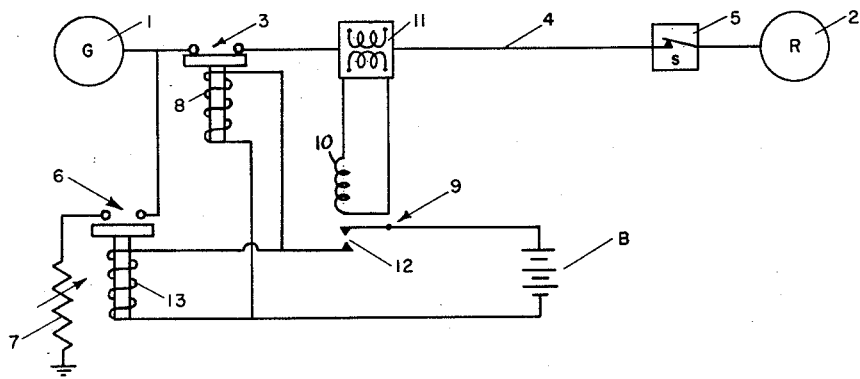
FIG. 2 is a simplified diagram showing one means of operating the control circuits of the circuit breakers of FIG. 1 at the generator end of the line.

The circuit breaker or switch 3 is of the reclosing type and may take any suitable form, one form being schematically indicated in FIG. 2. Circuit breaker 3 incorporates a coil 8 controlled by a relay 9 having a coil 10 and connected in line 4 via a transformer 11 shown symbolically and controlling contacts 12. Breaker 3 is serially connected in the transmission line and is normally closed. The contacts of breaker 6, which are controlled by coil 13, are in the branch circuit and are normally open, as shown. The characteristics of relay 9 are such as to maintain contacts 12 open until an abnormally high current flows in line 4, as will occur on the instance of a fault on the line. Closing of contacts 12 simultaneously energizes coils 8 and 13 through battery B and acts to open breaker 3 and close breaker 6.

After a predetermined time contacts 12 open, whereupon breaker 3 returns to its original closed condition, and preferably although not necessarily breaker 6 is simultaneously opened.

Referring now to the branch circuit, for any predetermined value of transmitted load prior to the fault, a value of the resistor 7 can be determined mathematically by established methods of calculation or by trial, so that when it is coupled to the generator, the generator will tend to decelerate at substantially the same rate as the decoupled receiving system. It then follows that if the value of resistor 7 is so determined, when breaker 3 recloses, the generator and receiving system will have approximately the same velocity and will be at approximately the same relative phase angle as existed prior to the fault; therefore, the stability of the system would not be adversely affected by the transient fault on the line.

Thus, for the sake of simplicity, neglecting line resistance, and the effects of conditions obtaining during the fault prior to the opening of the breaker 3, as well as governor action, the value of the resistive load required to cause the generator to decelerate at the same rate as the receiving system may be determined as follows:

Assuming $P$=power transmitted prior to the fault
$Q$=value of resistive load developed by resistor 7
$Mg$=generator inertia constant
$Mr$=receiving system inertia constant The rate of deceleration of the generator after a fault on the line is equal to $$\frac{Q-P}{Mg}$$

The rate of deceleration of the receiving system is equal to $$\frac{P}{Mr}$$

Hence, the generator and receiver will decelerate equally when $$\frac{Q-P}{Mg} = \frac{P}{Mr}$$

and solving for Q, $$Q = P\left(1 + \frac{Mg}{Mr}\right)$$

In practice, the ideal condition of zero relative phase displacement and velocity difference at the instant of reclosing will not be obtained with the above computed value of Q because there is a time lapse between the time of fault and the time that the circuit breaker 3 opens and circuit breaker 6 closes, and because of the effects of line losses and power loss in the fault. The effect of these factors can be compensated for by using a resistor 7, developing a load differing slightly from and generally greater than the above computed value. An improved value of optimum power demand can be determined for any assumed type of fault by means of appropriate calculations using known methods.

Actually, when resistor 7 is coupled to generator 1, the current flowing will not be constant but will, rather, vary in dependence on a variety of factors including the past effect of the current supplied to the fault, prior to the opening of breaker 3, the effect of voltage regulator action, and the fact that the value and power factor of the resistive load applied by the resistor will in general differ from the generator load prior to the fault.

This means that in practice the closing of breaker 6 will not act to apply a constant value of braking load. However, for any assumed fault condition the foregoing factors can be allowed for in calculation, using established methods, to chose an optimum value of resistor 7 in relation to any value and power factor of load prior to fault.

Alternatively, a desirable value of resistance may be determined on the basis of test results using approximate calculations as a guide.

In some cases it is satisfactory that resistor 7 have a fixed value. In such case the value of resistor 7 should be chosen with a view to preventing instability of the system at any load from zero to that corresponding to normal maximum transmitted load, which implies that it may be considered to be chosen to minimize the phase displacement and velocity difference of the generator and system on reclosing, for the case when the transmitted load prior to the fault has a value $P_0$ less than normal maximum transmitted load.

Under these conditions a fault occurring at a transmitted load substantially greater than $P_0$ will, prior to reclosure, cause the generator to both advance in phase and increase in velocity relative to the system, whereas a fault occurring at a load substantially less than $P_0$ will cause the generator to both retard in phase and decrease in relative velocity.

In numerous cases, depending primarily on the preset time of reclosure utilized, the inertia constants of the generator and system, and the synchronizing power of the line, an optimum value of $P_0$ and a related value of resistor 7 can be found which will insure an adequate margin of stability of the overall system at any load prior to fault from zero up to the full capacity of the generator prime mover.

In the case of multi-generator power systems, the value of resistor 7 may advantageously be varied in relation to the number of connected generators in the generating segment, as well as in relation to the connected capacity in the receiving system, desirable resistance values being determinable by established means of calculation or by trial.

Figure 3:
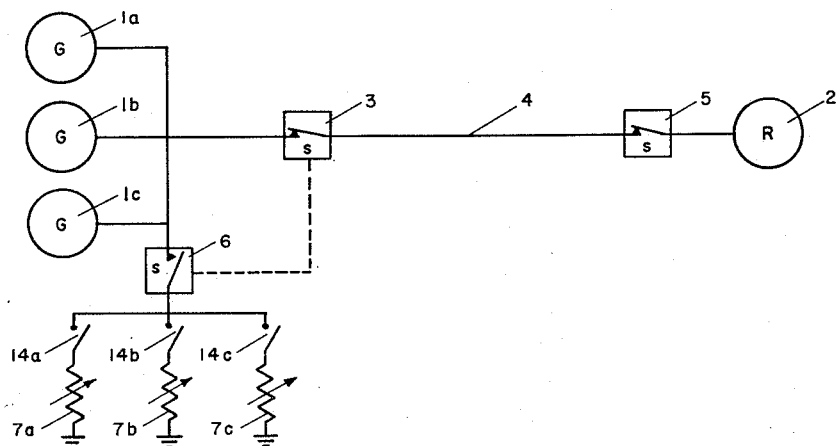
FIG. 3 is a simplified diagram which relates to another embodiment of the invention in which a plurality of generators supply power to a power system over a single line.

FIG. 3 shows how this can be accomplished by providing a series of resistors 7a, 7b, 7c and in the simplest case manually operated or controlled switches 14a, 14b and 14c. Thus, the size of the resistor 7 can be adjusted manually as load conditions vary.

Whereas the foregoing procedures may be used effectively in non critical applications, in general it is desirable that the value of the load resistor 7 be varied in dependence on the transmitted load prior to fault.

This may be accomplished most simply by inserting a switch in series with coil 13 of FIG. 2 and opening this switch at generator loads below a preset value and closing it at generator loads above this value, while at the same time reducing the value of resistor 7 so as to increase the value of resistive load that it develops to a value such that the shock to the system at any load tends to be a minimum.

As a further step, two braking resistors and associated breakers may be provided, both breakers being held open at low values of transmitted load, one being closed at intermediate values of load and both being closed in the high ranges of load.

Similarly, more than two resistive loads and associated breakers may be employed.

Although the control of the number of breakers held ready to close, in relation to transmitted load, can be accomplished manually, it will normally be advantageous to utilize automatic control means and it is one object of the present invention to provide effective means for such control.

Figure 4:
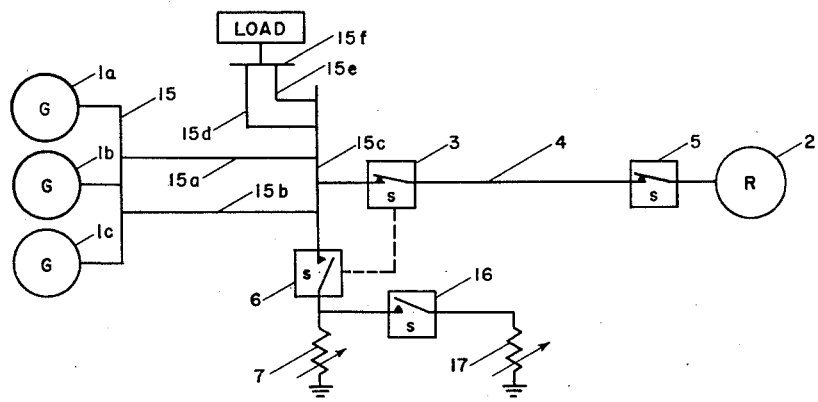
FIG. 4 is a simplified diagram which relates to another embodiment of the invention in which a segment of a power system containing load as well as generating capacity supplies power to the balance of the system over a single line.

Thus referring to FIGS. 4 and 5, a circuit incorporating one such automatic means (FIG. 5) is illustrated for the system shown in FIG. 4. The system comprises a generating segment having three generators 1a, 1b, 1c which are bussed together by bus 15 and supply power over two lines 15a and 15b. The lines 15a and 15b are bussed together by bus 15c and connections are made from the various loads to the bus 15c.

The generating segment and the two parallel lines 15a and 15b to bus 15 and the two parallel lines 15d and 15e from bus 15c to the load bus 15f, and the load, which may be an industrial and/or residential load, all taken together comprise a segment of the total power system, and the line 4 and the receiving system 2 comprise the balance of the system, the receiving system 2 normally containing within it generating capacity as well as diversified load of all types.

Coupled to the bus 15c are two braking resistors 7 and 17 utilized in association with two breakers 6 and 16.

Resistors 7 and 17 are variable and subject to manual control, as in FIG. 3, in order to allow adjustment for system connected generating capacity conditions.

In FIG. 5 there is illustrated one means for automatically varying the braking load in correspondence with the transmitted load. The automatically varying load means comprises a commutator 18 which is preferably in the form of a disc or drum, and consists of a conducting segment 19, and a non-conducting segment 20. The commutator is rotatably mounted on a shaft 21 and is driven over a coil spring 22 which is chosen with sufficient stiffness to normally drive commutator 18 without significant torsional deflections.

The commutator 18 acts through brushes 23, 24a and 24b to selectively couple coils 13a and 13b controlling the circuit breakers 6 and 16, to contacts 12, whereby upon contacts 12 being operated, a predetermined resistance is coupled to the bus 15c.

As shown in FIGS. 4 and 5, breaker 6 is in series with breaker 16. However, this feature is optional and a parallel connection may be used. The advantage of the series arrangement shown is that in FIG. 5 if breaker 16 is made to close slightly faster than, and is made to open slightly slower than breaker 6, the duty on breaker 16 is reduced, thereby allowing use of a less expensive breaker for 16 than would otherwise be required.

The number of resistors which should be coupled to the bus 15c is determined by the transmitted load; therefore, rotation of the shaft 21 is controlled (shown by dotted line) by a power operated wattmeter (of a type such as is commercially available and in wide commercial use) having sufficient speed of response to follow the rate of movement of prime mover valve gear, and thereby take account of any rapid load changes due to governor action which might be taking place just prior to a line fault.

A magnetic brake 25 locks commutator 18 in position when contacts 12 are closed.

Application to the circuits of FIGS. 1 to 3 would be similar to the arrangement of FIG. 5.

FIG. 6 relates to application of the invention to multiple transmission lines. In this figure, generators 26, 27 feed transmission line 28, and generators 29, 30 feed transmission line 31. Resistive load 32 is coupled to the generators 26, 27, respectively, over normally open switch 33, and resistive load 34 is coupled to the generators 29, 30 respectively, over normally open switch 35. In one method of operation bus tie breaker 36 is held open so that the two halves of the system are isolated at the generator end of the line. Thus, a failure on line 28 will result in the application of resistive load 32 to the generators 26 and 27, but will have no effect on the generators 29, 30.

In another method of operation, bus tie breaker 36 is held closed and the control circuits of the breakers 3a and 3b are paralleled, so that a fault on either line opens the breakers of both lines.

This latter procedure would be necessarily used in a circuit like that of FIG. 7 since splitting the part of the system to the left of lines 28 and 31 into two isolated segments would normally be undesirable.

In FIG. 6, when the bus tie breaker is closed, and in FIG. 7, the value of the load resistor may be made to depend on the transmitted load by use of the circuit of FIG. 5 except with the watt-meter connected to total the power supplied over both lines 28 and 31. Such parallel connection is required, similarly, with the circuit of FIG. 8, which shows three segments of a complete power system interconnected by three tie lines 38, 39 and 40.

FIG. 9 illustrates this form of the invention by way of example in application to segment 1 of the transmission system of FIG. 8.

As shown in FIG. 9, a wattmeter responsive to the net power output of segment 1, operates through circuits similar to the circuit of FIG. 5 to control the connection of braking resistors 7 and 17 to segment 1 tie line bus 15c, in the event of a fault on either line 38 or 39, and also to simultaneously open the segment 1 breaker on the unfaulted tie line. Similar parts in FIG. 9 which are used in addition to the parts illustrated in FIG. 5 have been identified by reference letters following the numbers used in FIG. 5. For example, in FIG. 5 the transformer was identified by number 11; in FIG. 9 where two transformers are required they have been identified by characters 11a and 11b.

Although I have illustrated the line circuits by a single line, the latter will normally be a three phase circuit, the breaker controlling all of the line phases.

Alternatively, provision of an arrangement in which the period of application of a fixed braking load is varied in dependence on load transmitted prior to fault can be employed as a substitute for a means of varying the magnitude of the applied braking load in dependence on transmitted load prior to fault.

Such an arrangement is shown in FIG. 10 wherein 44 represents a variable time delay relay incorporating an emergent shaft 45, the relay being so constructed that rotation of the shaft 45 varies the relay time setting, and drive means, not shown, which may be of the variable ratio type connected to disc 18 over shaft 21, the effect being that the time that breaker 6 is held shut is least at light load and greatest at heavy loads, the whole being preferably so arranged that the time that switch 46 remains shut is generally proportional to the magnitude of the transmitted load prior to the fault.

In another form of the invention, instead of applying braking load to that segment of the system which had been supplying load prior to the fault, the mechanical driving power supplied to at least some of the generators within that segment is momentarily decreased for a preselected period of time when the segment is isolated so as to result in an effect similar to that obtained by the application of a braking load.

In the case of steam turbines, for example, this can be accomplished by providing for rapid momentary closure or partial closure of the turbine steam inlet control valves in response to an electrical signal. In the case of gas turbines and diesel engines, a liquid fuel valve may be controlled.

FIG. 11 shows one means of accomplishment. Thus, in FIG. 11 turbine 46A drives generator 1 by means of steam admitted through valve 47 which is operated in response to motion of piston 48 of oil cylinder 49.

Displacement of piston 48 is controlled by servo valve 50 which is supplied with oil by pump 51 and is actuated in response to the position of fly balls 52 and valve 47, through levers 53 and 54.

One end of lever 54 is normally held against stop 55 by spring 56. However, when contacts 12 close, solenoid 58 is energized through normally closed time delay opening relay 57 and acts to depress lever 54, thereby simulating an increase in speeed and acting to close valve 47 independently of the fly balls 52.

Relay 57 opens after a controlled dwell period and thereby opens the circuit to solenoid 58 which allows lever 54 to move back against stop 55 with the result that valve 47 returns to its position prior to the fault, subject to any minor influence of the fly balls resulting from speed change occurring during the period of relay operation. The time delay introduced by time delay relay 57 can also be made to depend upon the power transmitted before the fault by substituting for relay 57, relay 44 of FIG. 10, plus the associated equipment of FIG. 10.

FIG. 12 discloses an alternative embodiment of the form of my invention disclosed in FIG. 5, like reference numerals being used for similar parts. The contact making wattmeter 60 has its contacts 61 connected on one side to the lower of the two contacts 12 and on the other side to one side of contacts 62 of normally closed momentary time delay opening relay 63 and through 62 to the coil of normally open relay 64. One side of normally open contacts 65 and 66 of relay 64 is connected to the lower of the two contacts 12. The other side of contact 65 is connected to the coil 13b while the other side of contact 66 is connected to the coil of relay 64. The relay 63 has its coil connected to be energized when contacts 12 close whereupon contacts 62 open after a momentary time delay.

In the event that a fault occurs on line 4 at a line load condition at which the wattmeter contacts 61 are closed, current flows from battery B through contacts 12, which were closed in response to the fault, and through contacts 61 and contacts 62, to energize relay 64 thereby closing contacts 65 for energization of the coil 13b which closes the switch 16. Also when relay 64 closes its coil is energized through contacts 66 to remain closed. Switch 6 is already closed. Therefore the resistors 7 and 17 are now both connected to the bus 15c.

In the event that the power transmitted over the line just prior to the fault is less than the preset value of load at which the wattmeter contacts close, the contacts 61 are open when the fault occurs and the resistor 17 is not connected to the bus 15c. Moreover, if the contacts 61 should close in response to the fault, after an inherent time delay characteristic of the device, the contacts 62 will then have opened, since the coil of relay 63 was energized to open 62 by the battery when contacts 12 closed. While the wattmeter moving element is fast enough to follow power changes prior to a fault, the relay 63 is chosen fast enough to open before any significant movement of the wattmeter moving system can occur, whereby energization of the coil 64 is prevented.

FIG. 13 discloses an alternative embodiment of the form of my invention disclosed in FIG. 10, like reference numerals being used for similar parts some of which are used in FIG. 12. The relay 44 is a normally closed, manually adjustable time delay opening relay having a control knob 45 for manually setting its time delay, and controlling contacts 46, while relay 67 has two pairs of contacts the lower pair 68 being normally closed and the upper pair 69 being normally open.

In the event of a fault occurring at a time when the line load is sufficient to maintain the contacts 61 closed, the contacts 12 close whereupon current flows from the battery B through contacts 61 and contacts 62 to energize the coil of relay 67 and thereby open the contacts 68. Simultaneously current flows from the battery through contacts 46 and coil 13 to close switch 6 and connect resistor 7 to the bus 15c. Also the contacts 69 close to maintain energy in the coil of relay 67 when contacts 62 open after a time delay. Since contacts 68 were opened, the continued energization of the coil of relay 44 is prevented, hence contacts 46 are not opened and switch 6 remains closed until contacts 12 open.

In the event that the fault occurs at a line load at which the contacts 61 are open, contacts 68 remain closed and contacts 46 open after the preset time delay of the relay 44 which causes switch 6 to open in a corresponding preselected time, thus removing resistor 7 from bus 15c at a preselected time and prior to the opening of contacts 12. Moreover, if the contacts 61 should close in response to the fault, after an inherent time delay characteristic of the device, the contacts 62 will then have opened since the coil of relay 63 was energized to open contacts 62 by the battery when contacts 12 closed, whereby energization of the coil of relay 67 is prevented.

The circuit of FIG. 13 can also be used in place of FIG. 10 as a means of causing the time delay introduced by the time delay relay of FIG. 11 to depend upon the power transmitted before the fault.

In the most general form of the present invention, both an increase in local electrical load and a reduction in driving force of generator prime movers may be utilized in response to transmission line fault indication, with the net effect of reducing the value of a quantity which may be designated as the "system generating segment accelerating power" relative to the value which would obtain in the absence of utilization of the invention wherein the term "system generating segment accelerating power" is defined in connection with means for isolating segments of a power system in the event of transmission line faults as the sum of the generator shaft power inputs of generator prime movers, in the system segment that was transmitting power prior to the fault, less the sum of all generating segment electrical loads obtaining after the isolation of the segment.

The schematically illustrated transmission line relaying and switching means may take one of many complex forms, in practical application, such as disclosed in AIEE Transaction, vol. 71, Part III, p. 661 et seq., "Power Line Carrier for Relaying and Joint Usage," and in AIEE Transactions, vol. 73, Part III–B, p. 842 et seq., "An Advance in Pneumatic Mechanism for High Voltage Power Circuit Breakers."

Such line circuit breaker and relaying forms may be represented adequately by the circuit of FIG. 14 wherein 103 represents the complete breaker and associated control system, 109 represents a quick opening and closing relay controlling contacts 112 in response to current in coil 110, and 111 represents the balance of the relaying system.

Such elements which normally incorporate the provision that breaker 103 will lock out after indication of a refault on reclosing, can be substituted for corresponding elements in earlier FIGS. 2, 5, 9, 11 and 12, provided that in FIGS. 2, 5, 9 and 12 resistor breakers 6 and 16 are replaced by a breaker and control system which will cause the substitute breaker or breakers to close rapidly in response to the only momentary closure of contacts 112, and thereafter open rapidly after a preset time delay which is capable of being adjusted so that the substitute breaker or breakers will open and lock in that position at about the time when the contacts of breaker 103 reclose, while also the same breaker and relay systems can be substituted for corresponding elements of FIG. 10 if provision is made so as to maintain energization of relay 44 for a preset period longer than the timing period of this relay, after only momentary energization by relay 109, and to lock the substitute breaker in the open position after it opens.

Provision of controls as above can be readily carried out by persons skilled in the art of relaying, by mere rearrangement of the type of equipment used in connection with provision for automatic line breaker reclosing, while also provision of breakers for load application capable of rapid closing followed by rapid reopening can be had by designing so that both of these actions take place under the effect of precompressed springs, in accordance with principles already described in AIEE Transactions, vol. 63, p. 784 et seq., "Tests of 230-Kv. High-Speed Reclosing Oil Circuit Breaker."

For example, the resistor load circuit breaker may be generally of the type illustrated in FIG. 15 wherein the position of rod 72 carrying bridging contact 71 controls the electrical bridging of contact studs 70 while tension springs 76 and 77 acting on lever 73 through rod 74 and floating lever 75 tend to raise and lower contact 71, respectively, while, in the position shown, motion of lever 75 and hence of rod 72 is restrained by toggles 78 and 79.

Admission of air to pneumatic cylinders 80 and 81 through valves 82 and 83 cocks the mechanism and serves to set the toggles in the position shown, while actuation of trip coils 84 and 85 respectively effect mechanical tripping of the toggles whereby to release lever 75 to the action of springs 76 and 77 respectively. Immediately after the breaker is cocked valves 82 and 83 are opened and accordingly thereafter energization of coil 84 will cause the breaker to close while subsequent energization of coil 85 will cause it to open.

Trip coil 85, which operates to open the breaker, is connected in series with auxiliary switch 86, so that it is inoperative except when the breaker is closed.

After the closing and opening cycle has been completed, the breaker is locked open until by the sequential admission of air, first to cylinder 80 and second to cylinder 81 the mechanism is recocked.

As shown control coils 84 and 85 are selectively subject to the action of double pole double throw relay 87 which is energized by relay 88 when condenser 89 is charged through resistor 90 after auxiliary relay 91 closes momentarily on momentary bridging of terminals 92 and, in turn, energizes coil 84 to close the breaker while the setting of shaft 145 of variable time delay opening relay 144 controls the time that will elapse before relay 87 is deenergized, by the opening of contacts 146, and the breaker opened in response to energization of trip coil 85, the size of condenser 89 being made such as to hold relay 88 closed for a period somewhat longer than any desirable time setting of relay 144.

In FIG. 15 item 93 represents a pair of terminals which are energized when relay 88 is energized.

FIG. 16, wherein the complete breaker and control system of FIG. 15 is represented by item 106 and another duplicate system by 116, illustrates how the breaker and control system of FIG. 15 together with items 103 and 109 and 111 of FIG. 14 may be substituted in FIG. 5, and it will be evident that the same type of substitution may be made in FIG. 9 without altering these circuits functionally.

Similarly FIG. 17 illustrates a revised form of FIG. 10 and FIG. 18 a revised form of FIG. 11, while it will be evident that FIGS. 12 and 13 can be similarly revised.

Besides incorporating elements 103, 109 and 111 in place of 3, 9 and 11, FIG. 18 shows further changes, some of which add to the scope of the present invention. Thus in FIG. 18 closure of quick opening and closing contacts 112 acts through relay 91 and resistor 90 to charge condenser 89, close relay 88 for a delay period longer than any desirable delay setting of relay 44, and actuate spring loaded normally closed 3-way hydraulic spool valve 159 to admit oil to cylinder 158, which results in depression of lever 54 and, via action of auxiliary servo system 162, causes motion of the stem of valve 47 in a valve closing direction. Also, at the same time valve 160, which is not spring loaded, opens to admit oil to adjustable stroke cylinder 161 which is arranged to move stop 55 downward a controlled amount.

After relay 44 times out spring loaded valve 159 returns to its initial position, thereby allowing discharge of oil from cylinder 158 to the oil tank under the influence of spring 56, and upward movement of lever 54 at a rate controlled by flow control valve 162a. At the same time since valve 160 is not spring loaded it will maintain oil pressure in cylinder 161 and thereby cause the upward motion of lever 54 to terminate at a lower point than prior to the fault.

Advantage of these arrangements is that by control of the setting of valve 162a it is possible to control the rate at which steam valve 47 tends to open when the line fault is cleared, while adjustment of the stroke of variable stroke cylinder 161 makes it possible to pre-establish a revised turbine speed load characteristic which will obtain subsequent to the fault, subject to repositioning of valve 160 by manual or manually controlled means. The effect of these controls is thus to provide a means of regulating rate and extent of regeneration of prime mover motive force, subsequent to reclosing of the line breaker.

Timing of 44 is controlled via rotation of shaft 45 which is driven by disc 18, which in turn is driven by shaft 21 over spring 22, and locked momentarily by brake 25 at the angle obtaining just before the fault. Dotted lines from both the wattmeter to shaft 21 and from gear 163 which is driven by rack 164 are intended to indicate that an election can be made to move shaft 21 either in response to transmitted power or to turbine valve gear motion.

As to such election, whereas, in the general case, applying to any sort of generating segment of a power system, it is requisite that control either of braking load or of degree of rapid prime mover valve action be made responsive to power transmitted away from the segment, in the case of isolated or substantially isolated power plants, and when, if braking resistors are used, each generator is equipped with its own control of degree of braking and/or prime mover valve gear motion, these controls can without disadvantage be made responsive to either individual generator output, or alternately to prime mover valve gear motion, since if there is no or little local load the total transmitted power just before the fault will be substantially equal to the sum of the power outputs and inputs of each unit.

Whereas FIG. 18 shows by way of illustration a multi-stage servo system wherein the motion of lever 54 is transmitted to valve 50 via an intermediate servo system, it is to be understood that operation would be equally possible in which 162 is replaced by a direct mechanical connection as in FIG. 11.

Whereas in the foregoing, for simplicity, the circuits shown did not include transformers, for stepping up generator voltage to a higher line voltage, it is to be understood that in practice line voltages will normally differ from generator voltages. Also in such case the normally open circuit breakers used for load application are preferably connected to the generator bus with a view to simplifying resistor design.

Whereas in connection with electrically paralleled circuit transmission arrangements of FIGS. 7 and 8 hereinbefore provision has been made for decoupling the generating segment prior to applying means of decelerating the generator segment, whether by use of a braking load or through rapid governor action, it will be apparent that when rapid governor action is available and when application of a braking load is not used the regulating devices that have been described may also be utilized so as to improve stability when the feature of decoupling is not used.

Thus with lines operating electrically in parallel the feature of decoupling will generally only be of advantage when use of braking resistors provides the only available means of decelerating the generating segment, whereas when rapid governor action can be used in place of a braking load it will normally be advantageous to omit the feature of decoupling by opening both sets of line breakers, and instead open only the breakers at both ends of the faulted line thereby to isolate the fault. In such case, moreover, use of provision to reclose automatically can be optional rather than requisite.

Whereas it has been recognized in the literature that in the case of such switching out of one of two parallel lines certain advantages could accrue in respect to improvement in power transmission system stability were means available whereby generator prime mover driving power could be rapidly and suitably controlled in the event of faults, heretofore automatic means of effecting suitable control have not been proposed.

The arrangement of FIG. 19 of the present invention illustrates one such means, specifically means whereby motive power input to the prime movers in a generating segment of a power system may be varied momentarily, and in a suitable manner, subsequent to the occurrence of a fault on one of two or more electrically parallel lines, in dependence on power flow conditions prior to the fault.

To accomplish this result one or more of the generators of FIGS. 7 or 8 is equipped so that in the event of a fault on one line the breakers at either end of the faulty line clear and the turbine steam valve or valves are subject to a closing cycle the duration of which is made to depend on the total transmitted power just prior to the fault. Specifically FIG. 19 shows a circuit adapted to accomplishing this result in application to segment 1 of FIG. 8.

In FIG. 19 relay systems 111a and 109a control breaker 103a, and 111b and 109b breaker 103b, so that a fault on a line opens only the breaker on that line with the further provision that breaker systems 103a and 103b may be either of the reclosing or non-reclosing type. At the same time auxiliary contacts 165 in breakers 109a and 109b are externally paralleled to control the relays and hydraulic controls shown in FIG. 18, in place of control by contacts 112 of relay 109, the circuits and connections being the same throughout. In addition auxiliary tap changing current transformers 166a and 166b provide a means whereby the wattmeter may be made to measure the weighted sum of the powers supplied over each line, and thereby the extent of turbine valve action resulting in the event of a fault may be controlled in dependence on the value of such a weighted sum just prior to the fault.

This feature of providing control in response to a weighted sum of transmitted powers is introduced due to the fact that, in general, for an optimum result, the degree of control desirable will depend on system conditions including, in particular, system connected generating capacity, and in the case of systems such as in FIG. 8, where lines are not connected to a common bus at the receiving end, on the distribution of load over each of the electrically parallel lines. Thus, the desirable control of the power input to a prime mover of a generator such as generator 1 in FIG. 8 will depend not only on the total load being supplied over line 38 and 39, but also on the distribution of load on these lines, as well as on the connected generating capacity in the other two systems.

On the other hand, in the case of parallel lines which terminate in a common bus at either end, the total or net power transmitted over both lines will provide the proper index of prime mover control in the event of a fault on either line, which implies that in this case the auxiliary transformer taps should be given equal settings.

In general, with use of the arrangement of FIG. 19 the degree of power input control effected should be substantially less than when complete generating segment decoupling is employed in line with the necessarily lesser value of generating segment driving power which develops when only one of two electrically parallel lines is decoupled. In practice the desirable degree of control can, however, be calculated in advance by established procedures, from a knowledge of pertinent system conditions.

After such calculation the taps on the auxiliary transformers may be set appropriately to afford a favorable degree of control.

Another further approach to the problem of maintaining stability in systems wherein a plurality of lines connect the generating segment to the balance of the system, which is adapted for use when the generating segment includes more than one connected generator, comprises in the event of a fault on a single line isolating only the affected line, and simultaneously reducing the generating segment accelerating power by decoupling one or or more of the generating segment generators during the period that the faulted line is open, applying a braking load and/or a reduction of driving power to the decoupled generators during the said period, and removing the braking load and reconnecting the said decoupled generator or generators to the generating segment at about the time that the line circuit breakers reclose.

This approach, which, it may be noted, is particularly useful in the case of water turbine type prime movers due to the need in such case of closing turbine inlet valves only slowly, is illustrated in FIG. 20 for the case of three generator connected by transformers to a common high voltage bus through high voltage breakers, one of which, 103c, is of the automatically reclosing type.

Thus referring to FIG. 20 it will be seen that a fault on either line besides opening the line breaker on the faulted line will close one set of contacts 165 and thereby act not only to momentarily open the breaker in the affected line, but also to momentarily open breaker 103c and momentarily close breaker 106, the period of closure of breaker 106 being governed by the position of disc 18 as determined by the weighted sum of the powers transmitted from the generating segment over lines 38 and 39 just prior to the fault.

It may be desirable to decouple and apply a controlled braking load to more than one of a plurality of generators, or to apply a combination of braking load and prime mover valve control, or to use a commutator actuated in response to the sum or weighted sum of the powers transmitted from the generating segment over each parallel line just prior to the fault to select one or more of a group of generators for decoupling, or to selectively apply one or more resistive loads in response to the sum or weighted sum of the powers transmitted from the generating segment over each parallel line just prior to the fault, thereby to variably control the degree of braking effect during the period of decoupling in response to the said sum or weighted sum of powers.

As another variant applying to a two line transmission system, two groups of generators can be decoupled and subject to braking load, one group in response to faults on one line, and one in response to a fault on the other, and both for faults on both lines.

Thus FIG. 21 illustrates how this can be done for the specific case of a two line system transmitting power from a two generator generating segment.

As a practically desirable feature making possible the use of load application breakers of only moderate interrupting capacity, it could be desirable to introduce a transformer between the generator bus and the associated load applying breaker, or alternatively to take braking load current from a tap on the main transformer low voltage winding, or from a third transformer winding.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

I claim:

1. A power system comprising a generating segment, a receiving segment, a transmission system coupling together said segments, thereby to carry transmitted power, normally closed circuit breaker means responsive to a fault on said transmission system for momentarily isolating said fault and decoupling said receiving segment from said generating segment, and means responsive to said fault for reducing the generating segment accelerating power, when said segments are decoupled, said means including switch means responsive to the fault for momentarily coupling one or more of a plurality of preselected resistive loads to the generating segment, and means whereby the number of such loads to be applied upon occurrence of the fault is varied in accordance with the magnitude of the transmitted power just prior to the fault.

2. A power system comprising a generating segment, a receiving segment, a transmission system coupling together said segments, thereby to carry transmitted power, normally closed circuit breaker means responsive to a fault on said transmission system for momentarily isolating said fault and decoupling said receiving segment from said generating segment, and means responsive to said fault for reducing the generating segment accelerating power when said segments are decoupled, said means including switch means responsive to the fault for coupling a preselected resistive load to the generating segment including means responsive to the transmitted power prior to said fault for controlling the duration of load application in response to the value of the transmitted power just prior to the fault.

3. A power system comprising a generating segment, a receiving segment, a transmission system coupling together said segments, thereby to carry transmitted power, normally closed circuit breaker means coupled in said transmission system, relay means responsive to a fault on said transmission system for momentarily opening said circuit breaker mean, thereby to isolate said fault and decouple said receiving segment from said generating segment, a plurality of resistive loads, a plurality of switches for connecting one or more of said resistive loads to said generating segment, selecting means responsive to the transmitted power just prior to the fault for selecting one or more of said switches, means controlled by said relay means for operating said selected switches, as determined by said selecting means, upon the occurrence of a fault, thereby to connect one or more of said resistive loads to said generating segment momentarily, after which said circuit breaker means is reclosed and said switches are opened.

4. A power system comprising a generating segment, a receiving segment, a transmission system coupling together said segments, thereby to carry transmitted power, normally closed circuit breaker means coupled in said transmission system, relay means responsive to a fault on said transmission system for momentarily opening said circuit breaker means, thereby to isolate said fault and decouple said receiving segment from said generating segment, a plurality of resistive loads, a plurality of switches for selectively connecting one or more of said resistive loads to said generating segment, selective relay means responsive to the transmitted power just prior to the fault for controlling the closing of at least one of said switches, and means operated by operation of said fault responsive relay means for closing a second of said switches in response to a fault.

5. A power system comprising a generating segment, a receiving segment, a transmission system coupling together said segments, thereby to carry transmitted power, normally closed circuit breaker means coupled in said transmission system, fault responsive relay means responsive to a fault on said transmission sytem for momentarily opening said circuit breaker means, thereby to isolate said fault and decouple said receiving segment from said generating segment, a resistive load, a normally open switch for connecting said resistive load to said generating segment, means operated by said fault responsive relay means for closing said normally open switch to connect said resistive load, and relay means responsive to the transmitted power just prior to the fault for controlling the opening of said switch.

6. A power system comprising a generating segment including a generator driven by a prime mover, a receiving segment, a transmission system coupling together said segments, normally closed circuit breaker means responsive to a fault on said system for momentarily isolating said fault and decoupling said receiving segment from said generating segment, and means responsive to said fault for reducing the generating segment accelerating power when said segments are decoupled, said accelerating power reducing means comprising prime mover driving power reduction means, means responsive to the speed of said prime mover for operating said prime mover driving power reducing means, and means operated by said fault responsive means for operating said prime mover driving power reducing means independently of said speed responsive means.

7. A power system comprising a generating segment including a given number of generators driven by a given number of prime movers, a receiving segment, a transmission system coupling together said segments, normally closed circuit breaker means responsive to a fault on said system for momentarily isolating said fault and decoupling said receiving segment from said generating segment, and means responsive to said fault for reducing the generating segment accelerating power when said segments are decoupled, said generating segment comprising one or more generators each driven by a prime mover, and said accelerating power reducing means comprising control means adapted to control the driving power of at least one of said prime movers, means responsive to prime mover speed for operating said control means, and means operated by said fault responsive means for operating said control means independently of said speed responsive means.

8. A power system comprising a generating segment, a receiving segment, a transmission system coupling together said segments, thereby to carry transmitted power, normally closed circuit breaker means responsive to a fault on said system for momentarily isolating said fault and decoupling said receiving segment from said generating segment, and means responsive to said fault for reducing the generating segment accelerating power when said segments are decoupled, said generating segment including one or more generators each driven by a prime mover, and said accelerating power reducing means comprising a control means adapted to control the driving power of at least one of said prime movers, means responsive to prime mover speed for operating said control means, and means operated by said fault responsive means for operating said control means independently of said speed responsive means including means responsive to the transmitted power just prior to said fault for operating said control means so as to variably control the magnitude of the prime mover driving power immediately following the occurrence of a fault in dependence on the transmitted power just prior to said fault.

9. A power system including a generating segment, a receiving segment, a transmission system coupling together said segments, thereby to carry transmitted power, normally closed circuit breaker means coupled in said transmission system and adapted to open in the event of a fault on the transmission system thereby to isolate the fault and decouple the generating segment from the receiving segment, and means for reducing relative acceleration of the generating segment and receiving segment when said receiving segment is decoupled from said generating segment, said means characterized by a branch circuit comprising a resistive load and a normally open switch adapted to couple said resistive load to said generating segment, said resistive load having a pre-established characteristic, and means for closing said switch substantially simultaneously with the opening of said breaker means whereby upon the occurrence of a fault on the transmission system said receiving segment is decoupled from said generating segment and said resistive load is applied to said generating segment, said system further comprising timing means for controlling the length of time said resistive load is applied to said generating segment, and means for controlling said timing means by the transmitted power just prior to the fault, so that the time period of applying the resistive load is varied in relation to the magnitude of transmitted power just prior to the fault.

10. A power system comprising a generating segment, a receiving segment, a transmission system coupling together said segments thereby to carry transmitted power, normally closed circuit breaker means coupled in said transmission system, relay means responsive to a fault on said transmission system for momentarily opening said circuit breaker means, thereby to isolate said fault and decouple said receiving segment from said generating segment, a plurality of resistive loads, a plurality of switches for connecting one or more of said resistive loads to said generating segment, selecting means responsive to the transmitted power just prior to the fault for selecting one or more of said switches, means, controlled by said relay means, for operating said selected switches, as determined by said selecting means, upon the occurrence of a fault, thereby to connect one or more of said resistive loads to said generating segment momentarily, after which said circuit breaker means is reclosed and said switches are opened, said selecting means further comprising a commutator under control of said transmitted power and divided into a conducting segment and a non-conducting segment, a plurality of brushes connected around the periphery of said commutator, a plurality of normally open switches coupled to said brushes respectively, said switches being under control of said relay means, whereby upon operation of said relay means the switches coupled to the brushes making contact with said conducting segment are closed, connecting the associated resistors to said generating segment.

11. A power system comprising a generating segment, a receiving segment, a transmission system coupling together said segments, thereby to carry transmitted power, normally closed circuit breaker means coupled in said transmission system and adapted in the event of a fault on the transmission system to isolate the fault and to decouple said generating segment from said receiving segment, and means for maintaining stability of the power system when said receiving segment is decoupled and subsequently reconnected to said generating segment, said means characterized by a branch circuit comprising normally open switch means coupled to said generating segment, a braking load comprising a plurality of resistors, braking load selective means under control of the transmitted load just prior to the fault for selectively connecting a given number of said resistors to said normally open switch, the magnitude of said braking load to be applied upon closure of said normally open switch being varied in accordance with the variations of the magnitude of the transmitted power just prior to the fault, relay means responsive to the occurrence of a fault on the transmission system for opening said circuit breaker to decouple said receiving segment from said generating segment, and for closing said switch to apply said selected braking load to said generating segment whereby the braking load is varied in relation to the transmitted power just prior to the fault, said relay means reclosing said circuit breaker and opening said switch after a preselected time, said braking load selective means comprising a commutator under control of said transmitted power just prior to the fault and divided into a conducting segment and a non-conducting segment, a plurality of brushes connected around the periphery of said commutator, a plurality of normally open switches coupled to said brushes respectively, said plurality of resistors being coupled to said switches respectively, said switches being under control of said relay means coupled in said transmission system, whereby upon operation of said relay means, the switches coupled to the brushes making contact with said conducting segment are closed connecting the associated resistors to said generating segment.

12. A power system comprising a generating segment, a receiving segment, a transmission system for coupling together said segments, thereby to carry transmitted power, a branch circuit connected to said generating segment, a plurality of normally open switches in said branch circuit, normally closed circuit breakers coupled in said transmission system, relay means in said transmission system operative in response to a fault thereon for opening the said normally closed circuit breaker means thereby isolating said fault and decoupling said generating segment from said receiving segment, and for closing at least one of said normally open switches in said branch circuit, a resistive braking load comprising a plurality of resistors each controlled by at least one of said normally open switches, selective closing control means for said switches, responsive to variations in the magnitude of the transmitted power just prior to the fault, thereby to preselect one or more of said switches for connection of a predetermined resistive braking load to said generating segment, whereby upon operation of said relay means said selected one or more of said switches are closed to connect said predetermined braking load to said generating segment.

13. A power system comprising a generating segment, a receiving segment, a transmission system coupling together said segments, thereby to carry transmitted power, normally closed circuit breaker means coupled in said transmission system, a relay means responsive to a fault on said transmission system for momentarily opening said circuit breaker means, thereby to isolate said fault and decouple said receiving segment from said generating segment, a plurality of resistive loads, a plurality of switches for connecting one or more of said resistive loads to said generating segment, selecting means for selecting one or more of said switches, means, controlled by said relay means, for operating said selected switches, as determined by said selecting means, upon the occurrence of a fault, thereby to connect one or more of said resistive loads to said generating segment momentarily, after which said circuit breaker means is reclosed and said switches are opened, operating means for said selecting means responsive to the transmitted power, and means responsive to operation of said relay means for securing said selecting means against operation by said driving means during the time interval that said relay means is operated.

14. The system according to claim 11 and further comprising means, responsive to operation of said relay means, for securing said commutator against movement during the time interval that said relay means is operated to open said circuit breaker means.

15. A power system comprising a generating segment, a receiving segment, a transmission system coupling together said segments thereby to carry a transmitted load, a branch circuit connected to said generating segment, a predetermined resistive braking load in said branch circuit, a normally open resistor switch means in said branch circuit, normally closed circuit breaker means coupled in said transmission system, relay means coupled in said transmission system and operative in response to a fault thereon for opening said circuit breaker means thereby to isolate said fault and decouple said generating segment from said receiving segment and for closing said resistor switch means in said branch circuit, whereby upon operation of said relay means said resistor switch means is closed to connect said resistor to said generating segment, a normally closed relay switch in series with said relay means, opening means operated by the operation of said relay means for opening said relay switch, variable time delay means for holding said relay switch closed against said opening means and operating means for varying said time delay means in relation to the transmitted power.

16. The system according to claim 15 and further comprising means responsive to operation of said relay means for securing said variable time delay means against operation by said operating means during the time interval that said relay means is operated to open said circuit breaker means.

17. A power system comprising a generating segment, a receiving segment, a transmission system including two or more transmission lines which provide parallel paths for coupling together said segments, thereby to carry transmitted power, said generating segment including one or more generators each driven by a prime mover, a normally closed circuit breaker at each end of one of said transmission lines, means responsive to a fault on said line for momentarily opening said breakers and isolating said fault, control means for controlling the driving power of at least one of said prime movers, including means responsive to prime mover speed for operating said control means, and means independent of said speed responsive means and responsive to said fault for causing said control means to effect a reduction of prime mover driving power including means responsive to the total power transmitted from the generating segment to the receiving segment over the said transmission system just prior to said fault for operating said control means so as to variably control the magnitude of said prime mover driving power reduction immediately following the occurrence of a fault in dependence on the transmitted power just prior to said fault.

18. A power system comprising a generating segment, a receiving segment, a transmission system including two or more transmission lines which provide parallel paths for coupling together said segments, thereby to carry transmitted power, said generating segment including one or more generators each driven by a prime mover, a normally closed circuit breaker at each end of one of said transmission lines, means responsive to a fault on said line for momentarily opening said breakers and isolating said fault, control means for controlling the driving power of at least one of said prime movers, including means responsive to prime mover speed for operating said control means, and means independent of said speed responsive means and responsive to said fault for causing said control means to effect a momentary reduction of prime mover driving power including means responsive to the total power transmitted from the generating segment to the receiving segment over the said transmission system just prior to said fault for operating said control means so as to variably control the magnitude of said prime mover driving power reduction immediately following the occurrence of a fault in dependence on the transmitted power just prior to said fault.

19. A power system comprising a generating segment, a receiving segment, a transmission system including two or more transmission lines which provide parallel paths for coupling together said segments, thereby to carry transmitted power, said generating segment including one or more generators each driven by a prime mover, a normally closed circuit breaker at each end of one of said transmission lines, means responsive to a fault on said line for momentarily opening said breakers and isolating said fault, control means for controlling the driving power of at least one of said prime movers, including means responsive to prime mover speed for operating said control means, and means independent of said speed responsive means and responsive to said fault for causing said control means to effect a reduction of prime mover driving power including means responsive to the weighted sum of the powers transmitted from the generating segment to the receiving segment over each parallel path of the said transmission system just prior to said fault for operating said control means so as to variably control the magnitude of said prime mover driving power reduction immediately following the occurrence of a fault in dependence on the weighted sum of the powers transmitted from the generating segment over each parallel path of the transmission system just prior to said fault.

20. A power system comprising a generating segment, a receiving segment, a transmission system including two or more transmission lines which provide parallel paths for coupling together said segments, thereby to carry transmitted power, said generating segment including one or more generators each driven by a prime mover, a normally closed circuit breaker at each end of one of said transmission lines, means responsive to a fault on said line for momentarily opening said breakers and isolating said fault, control means for controlling the driving power of at least one of said prime movers, including means responsive to prime mover speed for operating said control means, and means independent of said speed responsive means and responsive to said fault for causing said control means to effect a momentary reduction of prime mover driving power including means responsive to the weighted sum of the powers transmitted from the generating segment to the receiving segment over each parallel path of the said transmission system just prior to said fault, for operating said control means so as to variably control the magnitude of said prime mover driving power reduction immediately following the occurrence of a fault, in dependence on the weighted sum of the powers transmitted from the generating segment over each parallel path of the transmission system just prior to said fault.

21. A power system comprising a generating segment, a receiving segment, a transmission system including two or more transmission lines which provide parallel paths for coupling together said segments, thereby to carry transmitted power, said generating segment including two or more generators, a normally closed circuit breaker at each end of one of said transmission lines, means responsive to a fault on said line for momentarily opening said breakers and isolating said fault, and means responsive to said fault for reducing the generating segment driving power when said breakers are open, said means including switch means responsive to the fault for momentarily decoupling at least one of the generators in said generating segment and means for applying a braking load to said generator during at least a portion of the period of decoupling.

22. A power system as in claim 21 including means responsive to the total power transmitted from the generating segment to the receiving segment over the transmission system just prior to said fault for controlling the duration of braking load application in response to the value of the total power transmitted from the generating segment to the receiving segment over the said transmission system just prior to the fault.

23. A power system as in claim 21 including means responsive to the weighted sum of the powers transmitted from the generating segment to the receiving segment over each parallel path of the transmission system just prior to said fault for controlling the duration of braking load application in dependence on the weighted sum of the powers transmitted from the receiving segment over each parallel path of the transmission system just prior to said fault.

24. A power system as in claim 21 including means responsive to the total power transmitted from the generating segment to the receiving segment over the transmission system just prior to said fault for variably controlling the degree of braking effect during the period of decoupling in response to the total power transmitted from the generating segment to the receiving segment over the transmission system just prior to the fault.

25. A power system as in claim 21 including means responsive to the weighted sum of the powers transmitted from the generating segment to the receiving segment over each parallel path of the transmission system, just prior to said fault, for controlling the degree of braking effect during the period of decoupling in response to the weighted sum of the powers transmitted from the generating segment to the receiving segment over each parallel path of the transmission system, just prior to the fault.

No references cited.